United States Patent
Wu

(10) Patent No.: US 6,847,489 B1
(45) Date of Patent: Jan. 25, 2005

(54) HEAD-MOUNTED DISPLAY AND OPTICAL ENGINE THEREOF

(75) Inventor: Shih-Ping Wu, Chung Ho (TW)

(73) Assignee: Oculon Optoelectronics Inc. (TW)

( * ) Notice: Subject to any disclaimer, the term of this patent is extended or adjusted under 35 U.S.C. 154(b) by 0 days.

(21) Appl. No.: 10/708,272

(22) Filed: Feb. 20, 2004

(30) Foreign Application Priority Data

Jul. 9, 2003 (TW) .......................................... 92118771 A

(51) Int. Cl.[7] .......................... G02B 27/12; G02B 27/10; G02F 1/1335
(52) U.S. Cl. ..................... 359/630; 359/618; 359/627; 359/629; 359/631; 359/632; 359/633; 359/634; 349/13; 349/96
(58) Field of Search ................................ 359/618, 627, 359/629–634; 349/13, 96, 98, 114, 115, 64

(56) References Cited

U.S. PATENT DOCUMENTS 5,726,807 A  3/1998 Nakaoka et al.
2002/0167733 A1 * 11/2002 Roest ......................... 359/625

* cited by examiner

*Primary Examiner*—Hung Xuan Dang
*Assistant Examiner*—Joseph Martinez
(74) *Attorney, Agent, or Firm*—Connelly Bove Lodge & Hutz; Larry J. Hume

(57) ABSTRACT

A head-mounted display comprises monocular or binocular display chambers. Each display chamber is equipped with an optical engine that displays images. The mechanism of the optical engine is as follows: cast rays from a light source onto an LCoS device through a first polarizer, and an image is formed with rays, which reflect off the bottom of the LCoS device. The reflective rays penetrate the first polarizer and a film-coated beam splitter. With a concave mirror, the image is magnified and projected onto the surface of the beam splitter. Finally, the magnified image is formed in a viewer's eyeballs by means of the beam splitter.

20 Claims, 5 Drawing Sheets

HEAD-MOUNTED DISPLAY AND OPTICAL ENGINE THEREOF

BACKGROUND

1. Field of the Invention

The present invention relates to a head-mounted display (HMD) and the optical engine thereof and more specifically to a head-mounted display capable of showing images formed by means of an LCoS (liquid crystal on silicon) device.

2. Description of the Related Art

In recent years, virtual reality, a type of computer simulation technology, has been vigorously developed, and can make wearers temporarily feel that they exist in the three-dimensional (3D) space of a simulated world. Through a head-mounted display, the imitative voices and images are sent directly to the sense organs of the wearer. Due to previous practical experiences, the wearer would really think of these imaginary imagines as real ones. Currently, such apparatus has been widely applied in computer games. If a space positioner and a 3D joystick are added to the apparatus, there would be feeling of truer reality.

In addition to being the standard apparatus of virtual reality, the head-mounted display may be used to further replace the display of a TV or a computer. Furthermore, it is also an optimal solution for privacy when one uses a notebook in public place to avoid peeping of the others. Also, many workers who constantly move about, for example, researchers, soldiers or stockjobbers, need to complete their works by wearing a head-mounted display.

In as early as the 1960s, a professor from the University of Utah, the USA, formed the first head-mounted display with a cathode ray tube monitor, an optical system intended for focusing, and a computerized image creation unit, wherein the process of displaying signals on the screen was controlled by means of rotation of head. Afterward, thin film transistor liquid crystal display (TFT-LCD) was applied to head-mounted displays, and thus head-mounted displays became lighter and have been used increasingly in fields like entertainment, medicine, education, etc.

Recently, the technology of miniaturized LCoS displays has forged into maturity, and the miniaturized LCoS displays have been applied to the image generator used in head-mounted displays. The principle of manufacturing LCoS displays is as follows: form an active matrix driving circuit for driving liquid crystal materials on silicon substrate with a CMOS manufacturing process, and stack a liquid crystal layer and a glass plate on the silicon substrate to form an LCoS display. A light source emits a ray that enters the liquid crystal layer through the glass plate and returns to the upper surface of the glass plate by reflection, and eventually the LCoS display reflects the predetermined image. Hence, LCoS displays are also known as reflective liquid crystal displays. Since LCoS displays have a relatively high aperture ratio, luminance, resolution and contrast, and the equipment for their manufacturing process is relatively common, LCoS displays will be the mainstream image generators for head-mounted displays.

BRIEF SUMMARY

The objective of the present invention is to provide a head-mounted display and its optical engine, wherein images are formed by means of an LCoS device, and interfering rays are filtered out by means of the relative positions of a light source and a polarizer so as to secure good imaging quality.

In order to achieve the objective, the present invention discloses a head-mounted display and an optical engine thereof. The head-mounted display comprises monocular or binocular display chambers. Each display chamber is equipped with an optical engine that displays images. The mechanism of the optical engine is as follows: cast rays from a light source onto an LCoS device through a first polarizer, and an image is formed with rays, which reflect off the bottom of the LCoS device. The reflective rays penetrate, the first polarizer and a film-coated beam splitter. With a concave mirror, the image is magnified and projected onto the surface of the beam splitter. Finally, the magnified image is formed in a viewer's eyeballs by means of the beam splitter.

DESCRIPTION OF THE DRAWINGS

The invention will be described according to the appended drawings in which:

FIG. 2(*b*) is a magnified diagram of the portion B in FIG. 2(*a*);

DETAILED DESCRIPTION

Figure 1:
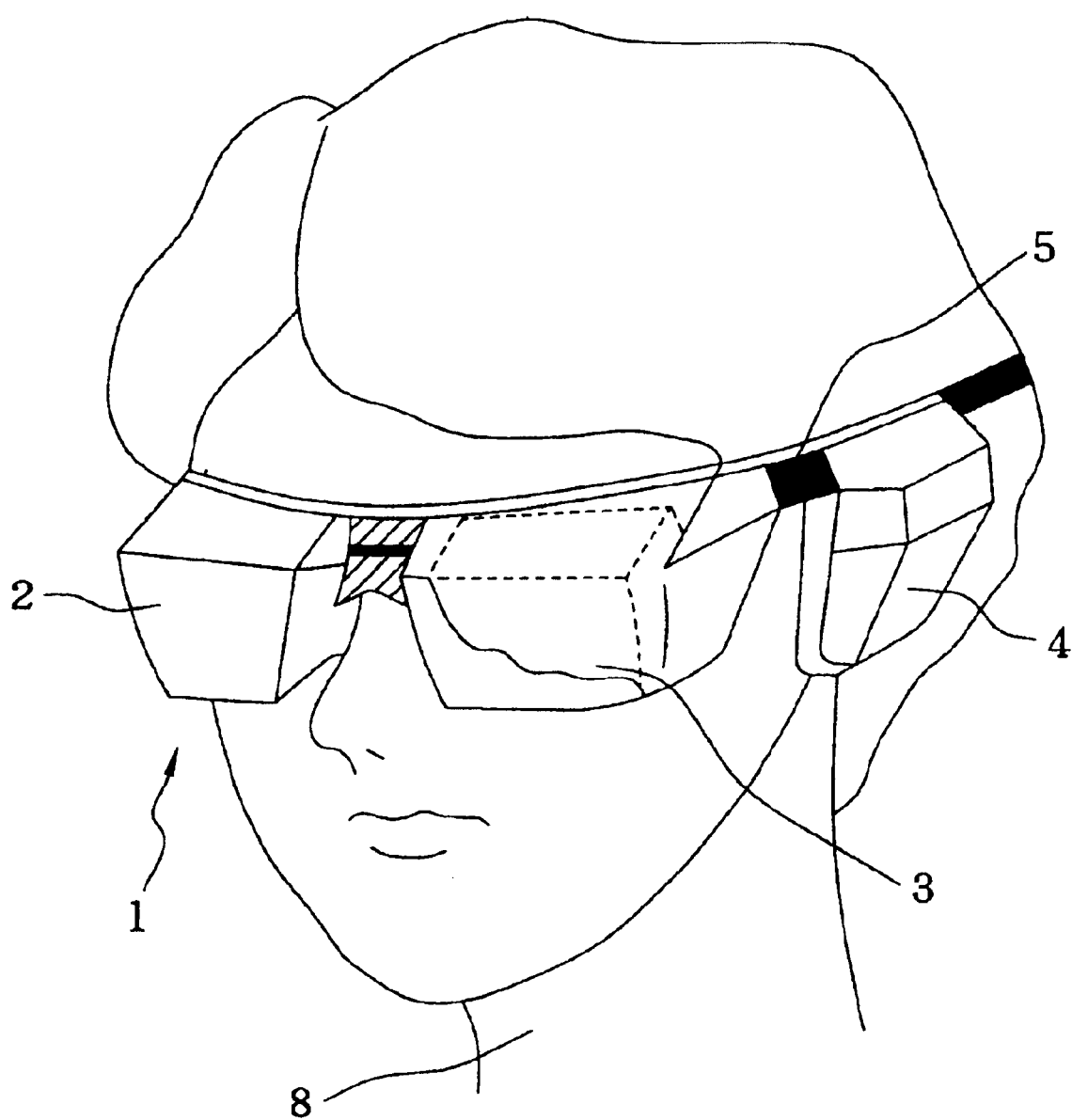
FIG. 1 is a perspective diagram of the head-mounted display in accordance with the present invention.

FIG. 1 is a perspective diagram of the head-mounted display in accordance with the present invention. The head-mounted display 1 comprises the display chambers 2 intended for the right eye and the left eye respectively, though its alternative design may have one single display chamber 2 intended for users who move about during work time. An optical engine 3, which creates images, is installed in each display chamber 2. With both eyes close to the display chambers 2, a user 8 browses various pictures displayed by the head-mounted display 1. In addition to the display chambers 2, the frame 5 of the head-mounted display 1 may be equipped with an earpiece 4 to make the head-mounted display more useful.

As shown in FIG. 2(*a*), the optical engine 3 essentially comprises an optical system composed of an LCoS device 12, a light source 16, a first polarizer 13, a beam splitter 14 and a concave mirror 15. The LCoS device 12 is installed on a circuit board 11. The light source 16 is obliquely fixed on the circuit board 11. The first polarizer 13 reflects part of the rays emitted by the light source 16 so that the reflective rays fall on the LCoS device 12, then the LCoS 12 reflects the rays which form a specific image so that they fall on the first polarizer 13. Part of the rays penetrate the first polarizer 13 and reach the beam splitter 14. Owing to a coated film on the surface of the beam splitter 14, incident rays are sent to the concave mirror 15 below by refraction, and the rays backwardly reflect off the concave mirror 15 and then travel in the direction of an analyzer 17.

The concave mirror 15 magnifies the image and sends it to the surface of the film-coated beam splitter 14 by reflection, and then the magnified image reflects off the beam splitter 14 and is finally formed in the eyeballs 80 of a user 8. As a result, the user 8 is able to watch the magnified image displayed by the optical engine 3 and centered at a visual axis 18 in a way comparable to the large-screen effect of an ordinary desktop monitor. The concave mirror 15 adopted in the present invention will magnify images to a greater extent and display images better, if it is non-spherical in shape. The analyzer 17 lying between the beam splitter 14 and the eyeballs 80 filters out stray light, making the images entering the eyeballs 80 softer.

Figure 2A:
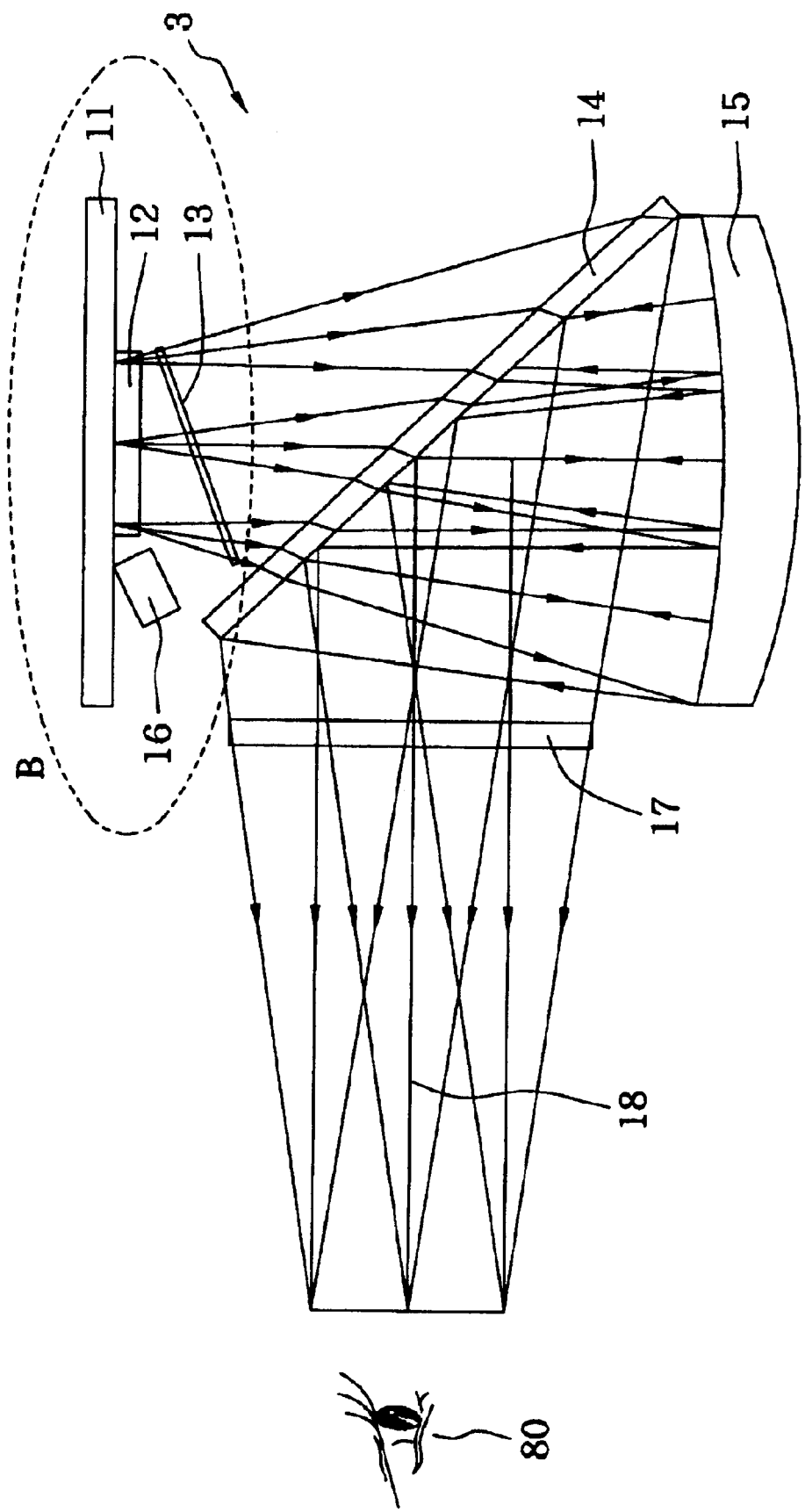
FIG. 2(*a*) is a schematic diagram of the optical engine in accordance with the first embodiment of the present invention.
Figure 2B:
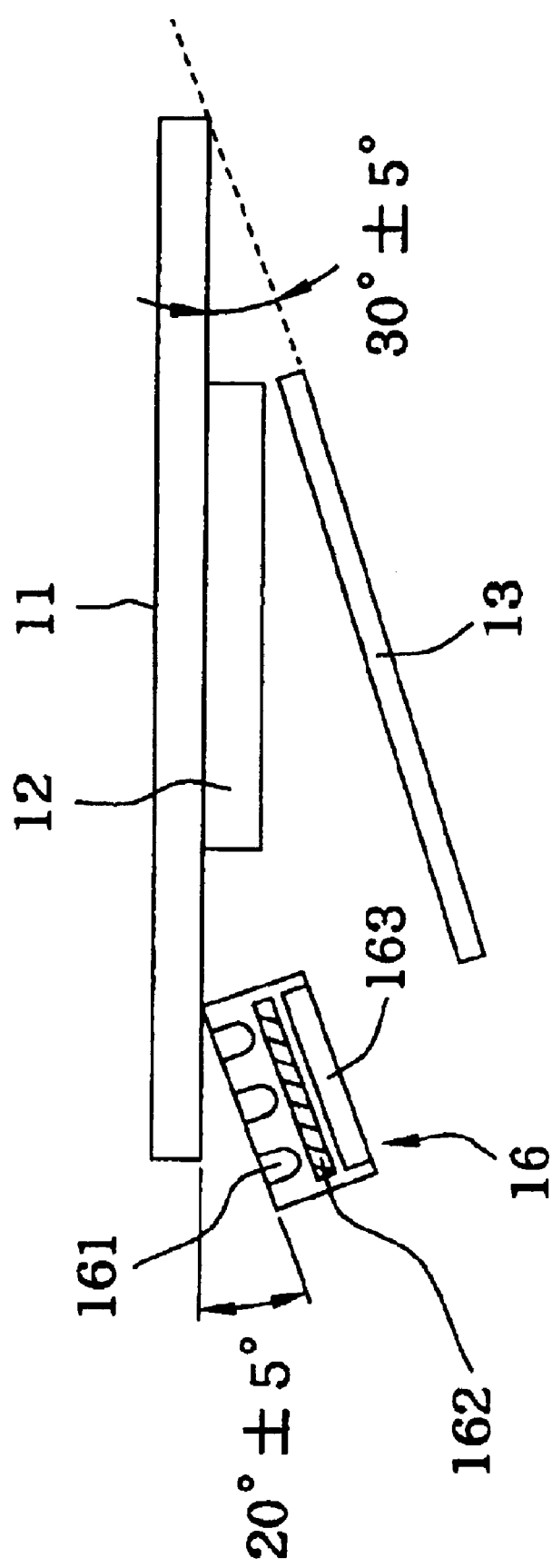

FIG. 2(b) is a schematic diagram of the magnified part B shown in FIG. 2(a). A 20°±5° included angle between the luminous surface of the light source 16 and the surface of the LCoS 12, coupled with a 30°±5° included angle between the first polarizer 13 and the surface of the LCoS 12, makes the optimal relative relationship, eliminating undesirable images like ghosting. The light source 16 comprises a light generator 161, a pre-polarizer 162 and a Fresnel lens 163. In general, the light generator 161 can be a tri-color RBG LED. The purpose of the pre-polarizer 162 is to absorb polarized light that travels in a certain direction but permit the passage of polarized light that travels in a different direction. The Fresnel lens 163 turns the passing rays into parallel rays and enables even distribution of light intensity.

Figure 3:
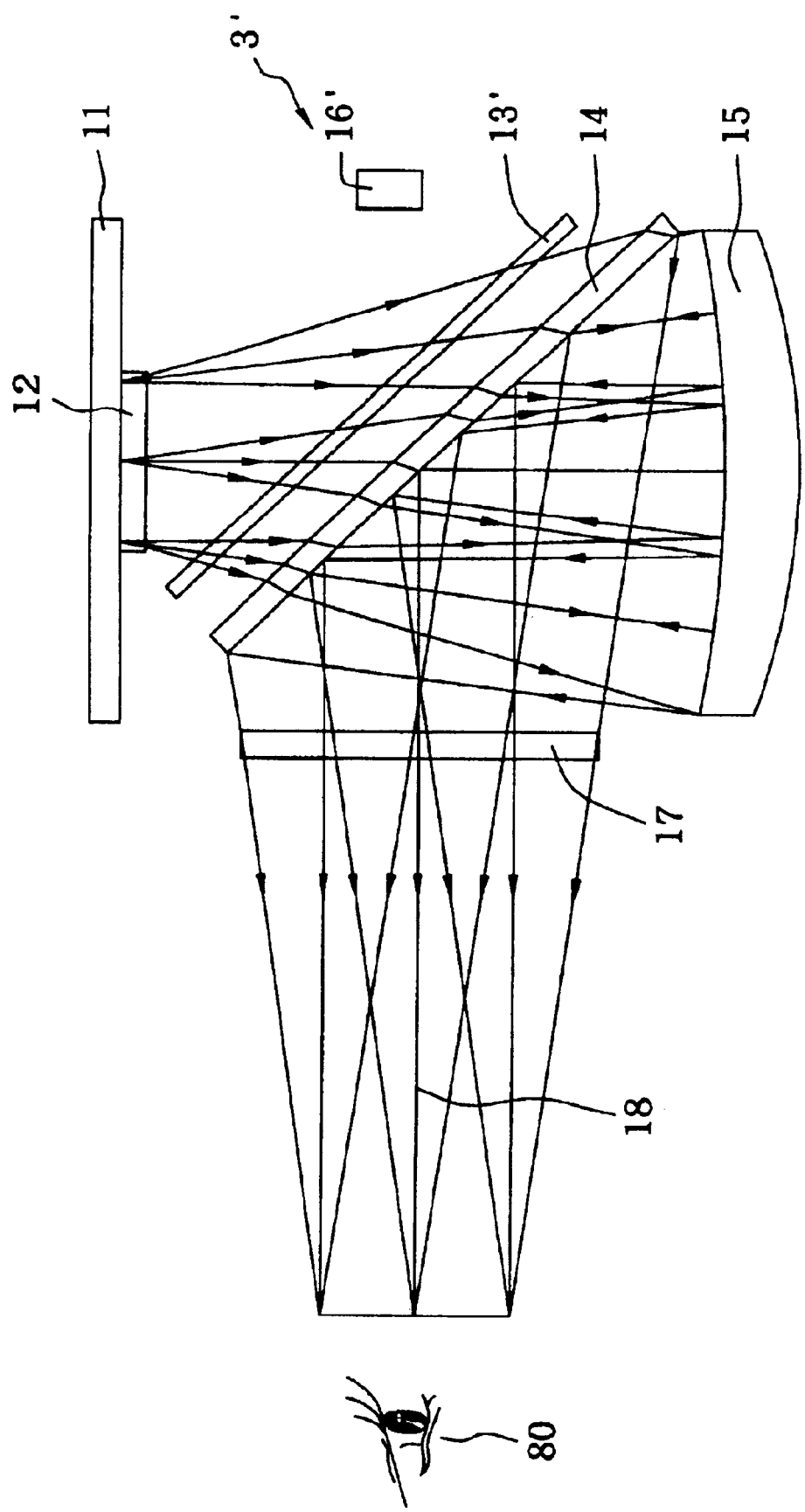
FIG. 3 is a schematic diagram of the optical engine in accordance with the second embodiment of the present invention.

FIG. 3 is a schematic diagram of the second preferred embodiment of the optical engine put forth in the present invention. Unlike FIG. 2, FIG. 3 shows a first polarizer 13' found in a position parallel to the beam splitter 14 instead of its previous position, a light source 16' lying to the right of the first polarizer 13', and the parallel rays emitted from the light source 16' falling on the first polarizer 13' at an incident angle of 45° approximately. The first polarizer 13' reflects part of the light emitted by the light source 16' so that it falls on the LCoS device 12. The LCoS device 12 then reflects the rays which form a specific image, so that the rays return to the first polarizer 13'. Part of the, rays penetrate the first polarizer 13' before they reach the beam splitter 14. Owing to a coated film on the surface of the beam splitter 14, incident rays are sent to the concave mirror 15 below by refraction, and the rays, backwardly reflect off the concave mirror 15 and then travel in the direction of an analyzer 17. In terms of its function, the first polarizer 13' may be directly incorporated into the beam splitter 14, that is, a polarizing beam splitter may substitute for the beam splitter 14 and the first polarizer 13'.

Figure 4:
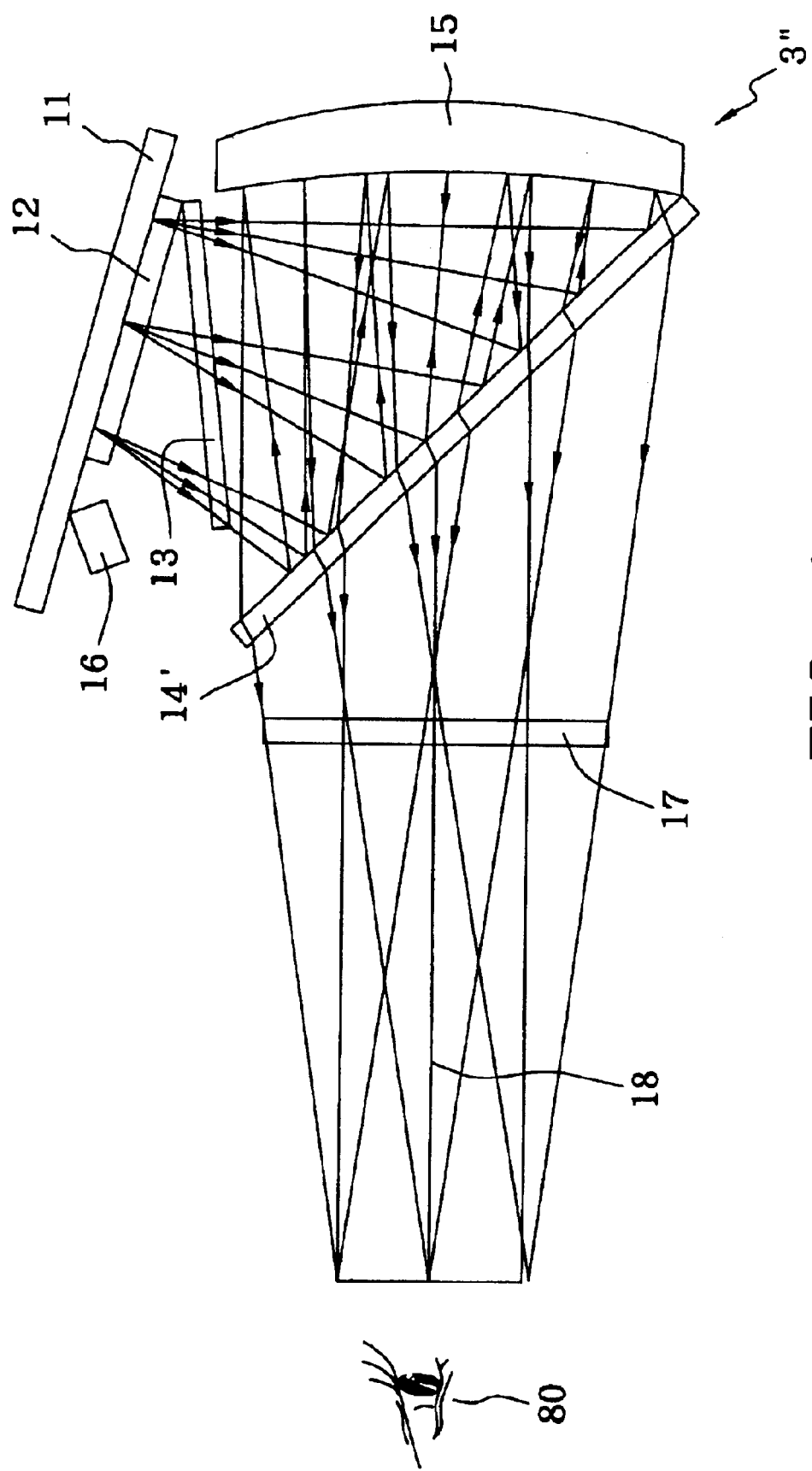
FIG. 4 is a schematic diagram of the optical engine in accordance with the third embodiment of the present invention.

FIG. 4 is a schematic diagram of the third preferred embodiment of the optical engine put forth in the present invention. As shown in FIG. 4, both the concave mirror 15 and the LCoS device 12 are installed on the same side of the beam splitter 14'. The first polarizer 13 reflects part of the light emitted by the light source 16 to send it to the LCoS device 12. The LCoS 12 then reflects the rays that form a specific image, so that the rays return to the first polarizer 13. The rays that form the specific image penetrate the first polarizer 13 before they reach the beam splitter 14'. Owing to a coated film on the surface of the beam splitter 14', incident rays are sent to the concave mirror 15 on the right side by refraction, and the rays backwardly reflect off the concave mirror 15 and then travel in the direction of the analyzer 17.

The above-described embodiments of the present invention are intended to be illustrative only. Numerous alternative embodiments may be devised by persons skilled in the art without departing from the scope of the following claims.

What is claimed is:

1. An optical engine for a head-mounted display capable of forming images before man's eyeballs to be watched, comprising:

a first polarizer;

a light source emitting rays toward the first polarizer;

an LCoS device for generating the images and reflecting reflective rays from the first polarizer to penetrate the first polarizer;

a concave mirror; and a beam splitter for refracting the rays of the images having penetrated the first polarizer to the concave mirror, which then magnifies the images and projects the magnified images on the beam splitter to be watched.

2. The optical engine for a head-mounted display of claim 1, wherein an included angle between a luminous surface of the light source and a surface of the LCoS device is in a range of 15 to 25 degrees, and an included angle between a surface of the first polarizer and a surface of the LCoS device is in a range of 25 to 35 degrees.

3. The optical engine for a head-mounted display of claim 1, wherein a luminous surface of the light source is perpendicular to the LCoS device, and an included angle between the first polarizer and the surface of the LCoS device is substantially 45 degrees.

4. The optical engine for a head-mounted display of claim 1, further comprising a pre-polarizer placed between the beam splitter and the eyeballs.

5. The optical engine for a head-mounted display of claim 1, wherein the light source includes:

a light generator for generating visible rays;

a pre-polarizer allowing a part of the visible rays in a certain polarized direction to pass through; and a Fresnel lens for changing the rays passing through the pre-polarizer into parallel rays.

6. The optical engine for a head-mounted display of claim 5, wherein the light generator is composed of a red LED, a blue LED and a green LED.

7. The optical engine for a head-mounted display of claim 1, wherein the first polarizer is substantially parallel to the beam splitter.

8. The optical engine for a head-mounted display of claim 7, wherein the first polarizer and the beam splitter are combined into a polarized beam splitter.

9. The optical engine for a head-mounted display of claim 1, wherein a coated film is formed on the surface of the beam splitter.

10. The optical engine for a head-mounted display of claim 1, wherein the concave mirror is a non-spherical concave mirror.

11. An optical engine for a head-mounted display capable of forming images before man's eyeballs, comprising:

a first polarizer;

a light source for emitting rays toward the first polarizer;

an LCoS device for generating the images and reflecting reflective rays from the first polarizer to penetrate the first polarizer;

a concave mirror; and a beam splitter reflecting the rays of the images having penetrated the first polarizer to the concave mirror, which magnifies the images and has the magnified images pass through the beam splitter to the eyeballs.

12. The optical engine for a head-mounted display of claim 11, wherein an included angle between a luminous surface of the light source and a surface of the LCoS device is in a range of 15 to 25 degrees, and an included angle between the surface of the first polarizer and the surface of the LCoS device is in a range of 25 to 35 degrees.

13. The optical engine for a head-mounted display of claim 11, further comprising a pre-polarizer placed between the beam splitter and the eyeballs.

14. The optical engine for a head-mounted display of claim 11, wherein the light source includes:

a light generator for generating visible rays;

a pre-polarizer allowing a part of the visible rays in a certain polarized direction to pass through; and a Fresnel lens for changing the rays passing through the pre-polarizer into parallel rays.

15. The optical engine for a head-mounted display of claim 14, wherein the light generator is composed of a red LED, a blue LED and a green LED.

16. The optical engine for a head-mounted display of claim 11, wherein the concave mirror is a non-spherical concave mirror.

17. A head-mounted display, comprising:

at least one display chamber having an optical engine therein, wherein the optical engine includes:

a first polarizer;

a light source for emitting rays toward the first polarizer;

an LCoS device for generating images and reflecting reflective rays from the first polarizer to penetrate the first polarizer;

a concave mirror; and a beam splitter refracting the rays of the images having penetrated the first polarizer to the concave mirror, which magnifies the image and projects the magnified images on the beam splitter to be watched; and a frame for holding the display chamber.

18. The head-mounted display of claim 17, further comprising an earpiece fixed on the frame.

19. A head-mounted display, comprising:

at least one display chamber having an optical engine therein, wherein the optical engine includes:

a first polarizer;

a light source for emitting rays toward the first polarizer;

an LCoS device for generating images and reflecting reflective rays from the first polarizer to penetrate the first polarizer;

a concave mirror; and a beam splitter reflecting the rays of the images having penetrated the first polarizer to the concave mirror, which magnifies the images nd redirects the magnified images through the beam splitter to the eyeballs; and a frame for holding the display chamber.

20. The head-mounted display of claim 19, further comprising earpiece fixed on the frame.

* * * * *